Nov. 13, 1934.　　　R. E. BECHTOLD　　　1,980,949
LIQUID DISPLACEMENT METER
Filed March 14, 1932　　4 Sheets-Sheet 1
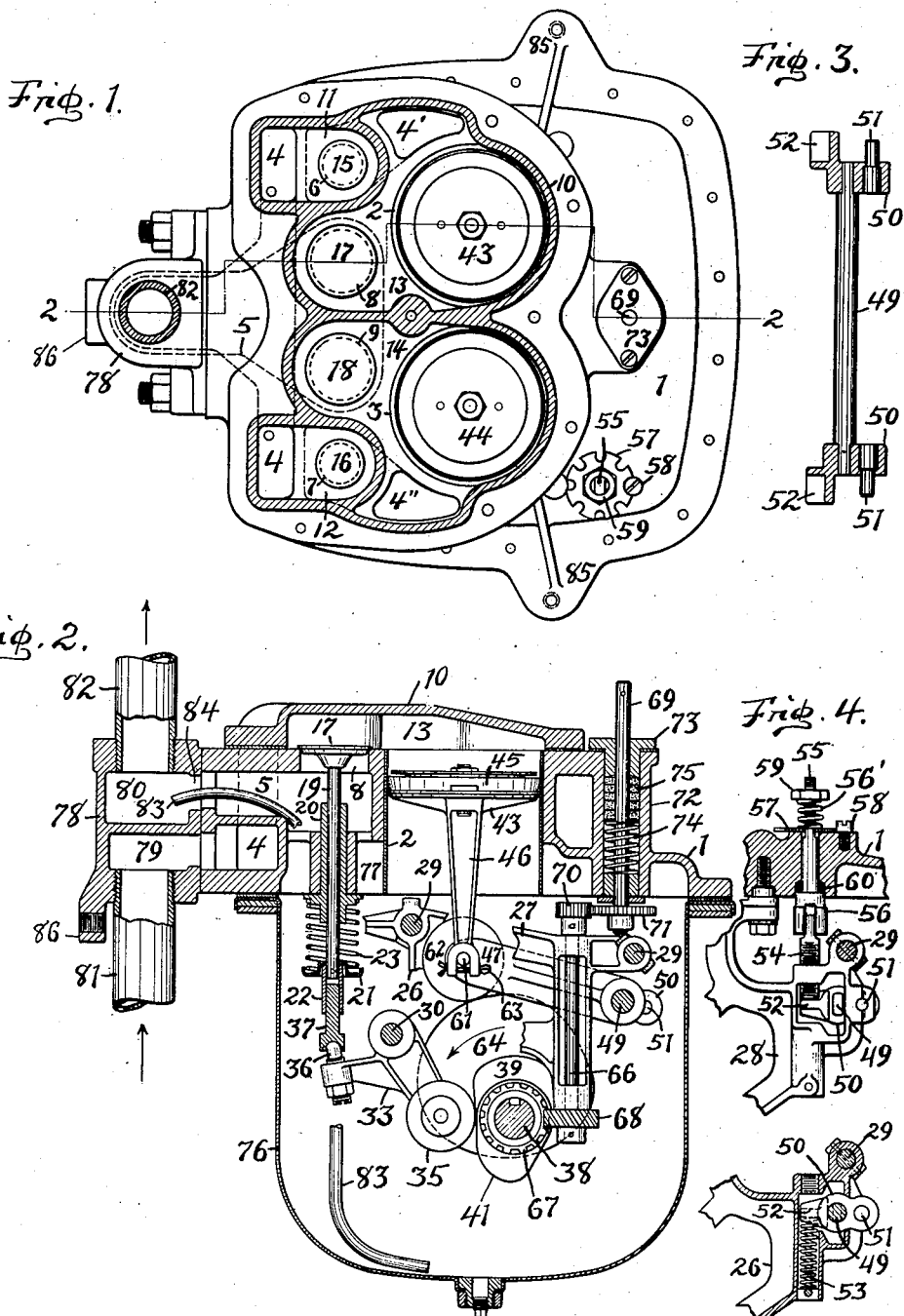

Nov. 13, 1934.  R. E. BECHTOLD  1,980,949
LIQUID DISPLACEMENT METER
Filed March 14, 1932   4 Sheets-Sheet 2

Reuben E. Bechtold INVENTOR
BY
A. G. Burns ATTORNEY

Nov. 13, 1934.  R. E. BECHTOLD  1,980,949
LIQUID DISPLACEMENT METER
Filed March 14, 1932 4 Sheets-Sheet 3

INVENTOR.
Reuben E. Bechtold
BY
H. G. Burns ATTORNEY.

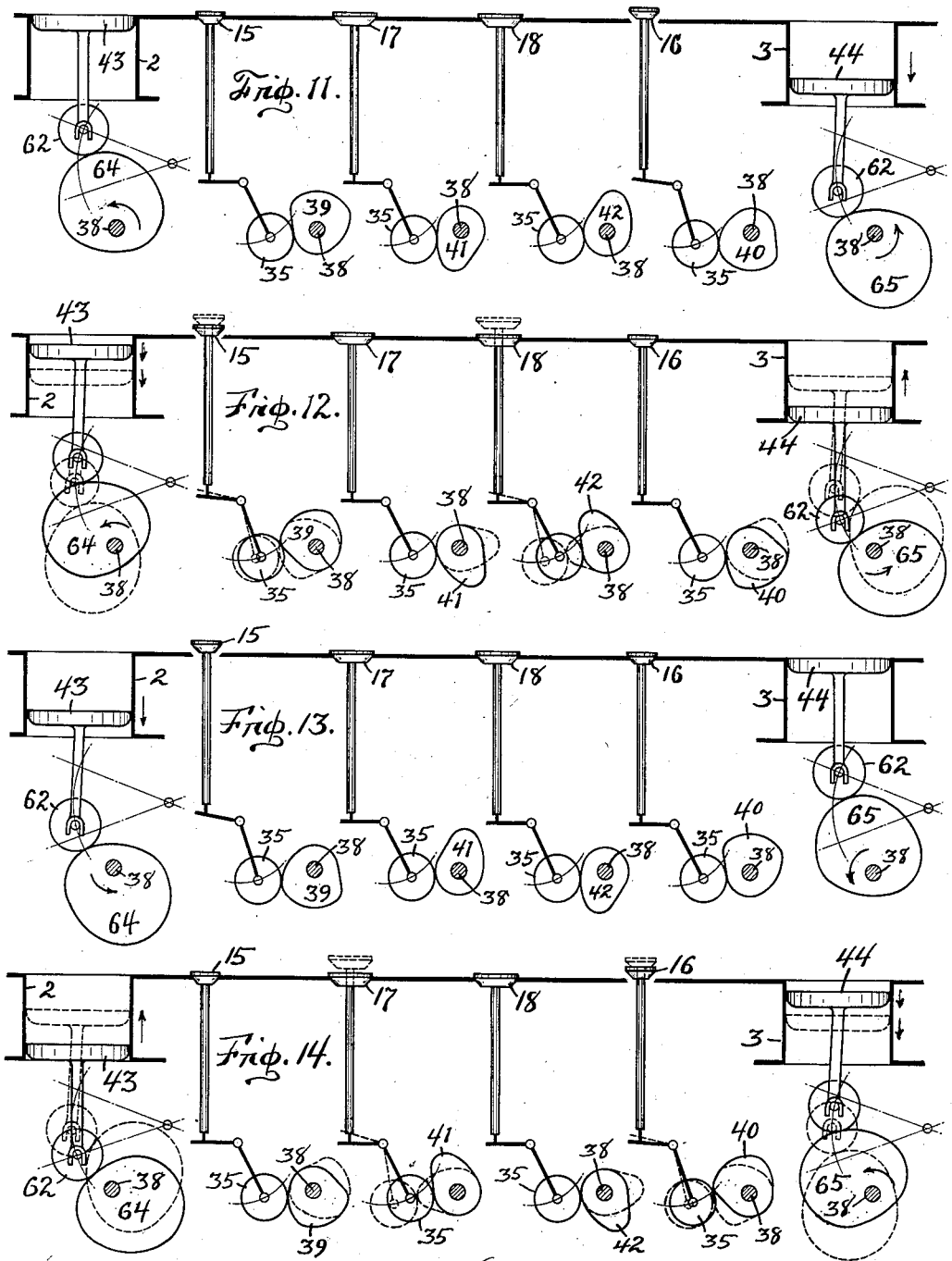

Patented Nov. 13, 1934

1,980,949

UNITED STATES PATENT OFFICE 1,980,949

LIQUID DISPLACEMENT METER

Reuben E. Bechtold, Fort Wayne, Ind., assignor to Tokheim Oil Tank and Pump Company, a corporation of Indiana Application March 14, 1932, Serial No. 598,583

7 Claims. (Cl. 73—30)

This invention relates to improvements in liquid displacement meters for ascertaining the volume of liquid that is transferred from a source of supply to a point of delivery, the construction herein set forth being in a preferred form adapted for use in gasoline dispensing apparatus for filling stations and constitutes the measuring means therefor.

One of the objects of the invention is to provide a liquid measuring appliance, operated by pressure of the liquid flowing therethrough, so constituted that operation of the appliance and flow of the liquid are uniformly concurrent throughout the cycles of operation. Other objects and advantages of the invention will appear in the following description.

An illustrative embodiment of the invention is shown in the accompanying drawings, in which:—

Fig. 1 is a top plan view of a meter in which the invention is embodied, the head block cover being in section;

Fig. 2 is a vertical section projected from Fig. 1 on the line 2—2 thereof;

Fig. 3 is a detail showing a plan view of the rocker arm support, parts being in section;

Fig. 4 is a detail elevation of the mount and adjusting means for the rocker arm support, parts being in section;

Fig. 5 is a similar detail view of the opposite end of the mount for the rocker arm support;

Figs. 11, 12, 13 and 14 are diagrams showing the relative positions of the plungers and the inlet and outlet valves as they are disposed at corresponding periods in their cycle of operation.

Figure 7:
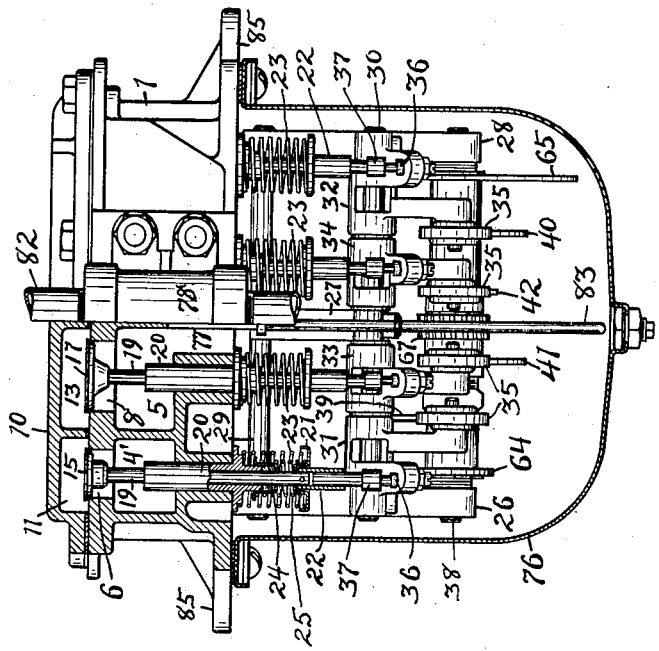
Fig. 7 is a front end elevation of the meter, parts being in section.
Figure 6:
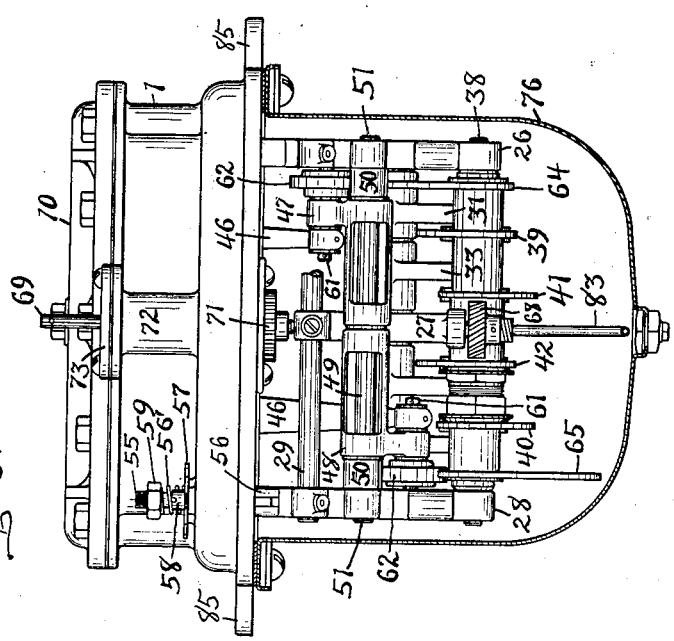
Fig. 6 is a rear end elevation of the meter, the bowl being in section.
Figure 8:
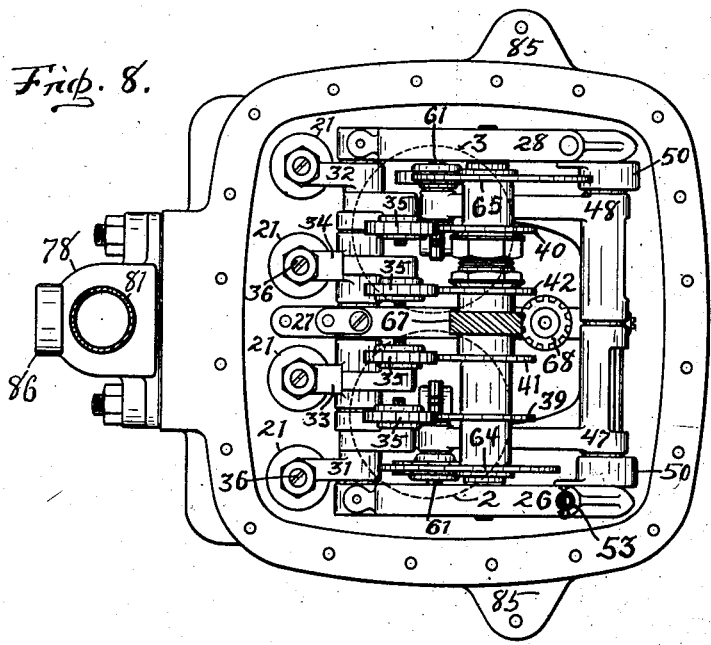
Fig. 8 is a bottom plan view of the meter, the bowl being omitted.
Figure 9:
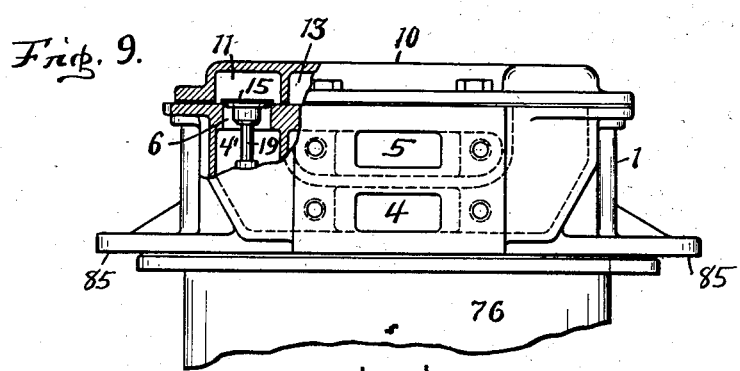
Fig. 9 is a front elevation of the head block and adjacent housing members, parts being broken away.
Figure 10:
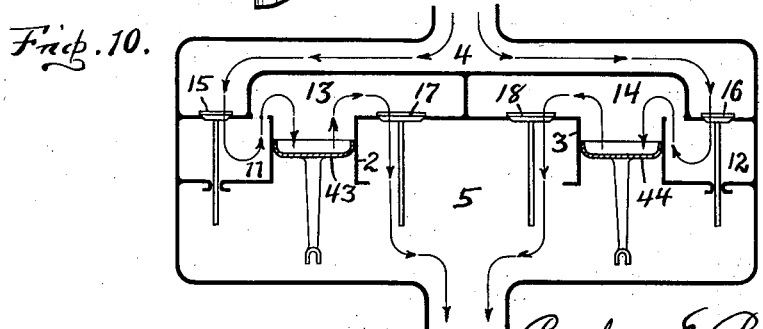
Fig. 10 is a diagram illustrating the courses of liquid flow through the apparatus.

The illustrative embodiment of the invention comprises apparatus having a valve-controlled liquid displacement mechanism actuated by the pressure of liquid measured thereby. The apparatus has a head-block 1 provided with two similar plunger cylinders 2 and 3, an inlet duct 4 and an outlet duct 5. Also, in the head-block are provided inlet ports 4' and 4'' and corresponding inlet valve openings 6 and 7 and outlet valve openings 8 and 9.

Upon the top of the head block is secured a cover 10 that has in its lower face inlet valve chambers 11 and 12 through which the respective inlet valve openings 6 and 7 communicate with the inlet duct 4, and also transfer chambers 13 and 14 with which the corresponding upper ends of the plunger cylinders, inlet ports and outlet valve openings communicate. The inlet valve openings 6 and 7 are controlled by corresponding poppet inlet valves 15 and 16, and the outlet valve openings 8 and 9 are controlled by corresponding outlet poppet valves 17 and 18. The stem 19 of each of said valves extends through a guide 20 provided therefor in the head-block and has on its lower end a fixture having a spring seat 21 and tappet guide 22. A compression spring 23 is disposed between the seat and the guide 20 so as to normally hold the valve in closed position. Also, a suitable packing member 24 is provided for the lower end of the guide 20 and the stem 19 of each inlet valve which is held in place by a spring 25 interposed between the spring seat 21 and said packing member.

The lower end of the head block has secured thereto a pendent frame constituted of three members 26, 27 and 28 connected by transversely disposed tie rods 29 and 30. Upon the rod 30 are mounted a series of oscillating bell-cranks 31, 32, 33 and 34, each having on one of its arms a roller 35, and in its other arm an adjustable post 36. The bell-cranks are operatively associated with the inlet and outlet valves respectively by means of tappets 37 disposed on the posts and held in operating position by the guides 22.

In the frame-members is rotatively mounted a cam-shaft 38 having thereon cams 39 and 40 that are engaged with the rollers 35 on the bell-cranks 31 and 32 respectively so that upon rotation of the cam-shaft the inlet valves 15 and 16 are actuated. The outlet valves 17 and 18 are similarly actuated by cams 41 and 42 on said camshaft through the medium of corresponding bell-cranks 33 and 34.

In the cylinders 2 and 3 are respectively disposed reciprocating plungers 43 and 44 of any suitable construction, each having a packing 45 and an operating arm 46. The plungers have operative relation with corresponding rocker arms 47 and 48 that are pivotally disposed upon a common adjustable supporting shaft 49. Upon the ends of the shaft 49 are firmly secured corresponding brackets 50 having alined trunnions 51 eccentrically disposed respecting the shaft, and being provided also with lugs 52 respectively that project from the opposite ends of the brackets.

The trunnions have pivotal support in the frame members 26 and 28 so that the brackets and the shaft 49 are movable upon the axis of the trunnions. A compression spring 53 in the frame member 26 bears upwardly against the lug 52 on the adjacent bracket 50, and an adjusting screw 54 in the frame member 28 bears down upon the lug of the other bracket. Thus, when the screw is turned the shaft 49 is adjustably raised or lowered accordingly. An adjusting stem 55 extends through the head-block 1 in alinement with the screw 54, the lower end of which has a slotted head 56 operatively engaging the screw 54 so that by turning the stem adjustment of the screw is effected. The upper end portion of the stem is threaded and the sides thereof are flattened, and a notched disc 57 is disposed thereon by which the stem is adjustably turned. The disc is held in adjusted positions by means of a lock-screw 58 provided therefor. Upon the upper end of the stem 55 is disposed a nut 59, and a spring 56' is interposed between the nut and the disc 57 whereby the stem is drawn upwardly to compress the packing 60 therefor.

In the swinging end of each rocker arm 47 and 48 is secured a shaft 61 the ends of which project laterally therefrom. One end of each shaft has mounted thereon a roller 62, and the opposite end is connected with the operating arm 46 of the corresponding plunger 43—44. The lower end of each arm 46 is bifurcated and is secured in place on the shaft by a cotter-pin 63 to permit convenient removal of the plunger.

The plungers 43 and 44 are operatively related respectively with cams 64 and 65 on the cam-shaft 38 through the medium of the corresponding rocker arms and their rollers 62 which bear upon the cam faces. The plunger cams 64 and 65 have like profiles, are disposed on the cam-shaft relatively 180 degrees apart, and are so shaped that the down strokes of the plungers are substantially of longer duration as compared with the duration of the up-strokes thereof. The cam-shaft is actuated by the plungers during the down-strokes thereof and the plungers are actuated during their up-strokes by said cams respectively. The actuating periods of the plungers alternate and overlap each other so that the down-stroke of one plunger is begun before completion of the down-stroke of the other plunger. In this manner the cam-shaft is actuated continuously without interruption, and dead centering of the actuating members is circumvented. The face of each plunger cam has a dwell or concentric portion in the high and low sides thereof whereby the corresponding plunger is momentarily sustained at the ends of its strokes without movement, and its complemental inlet and outlet valves are timed to be operated only during the dwell periods of the plunger while disposed at the ends of its strokes. Thus, after the plunger 43 has completed its up-stroke and while sustained in its uppermost position, the outlet valve 17 is closed after which and before commencement of the down-stroke of the plunger, the inlet valve 15 is opened. And, after the plunger has completed its down-stroke and while sustained in its lowermost position the inlet valve is closed after which and before commencement of the up-stroke of the plunger, the outlet valve is opened. In this manner flow of liquid into and from the transfer chamber 13 is dependent upon concurrent movement of the plunger. The sequence of operations with respect to the plunger 44 and its complemental inlet and outlet valves 16 and 18 is in the same order as that described in reference to the other plunger and its related valves.

A countershaft 66 is rotatively mounted in the frame member 27 and is actuated by the cam-shaft 38 through the medium of spiral gears 67 and 68 secured respectively on the cam-shaft and countershaft. The upper end of the countershaft is operatively connected with a spindle 69 by means of gears 70 and 71. The spindle is rotatively mounted in the head block 1, there being provided a packing chamber 72 for the spindle. The upper end of the chamber is closed by a packing gland 73 seated thereon and through which the spindle extends, and in the chamber is disposed a spring 74 and packing 75 arranged so that the packing is compressed about the spindle and against the gland to thereby prevent leakage out through the chamber.

A bowl 76 is secured to the lower end of the head block 1 and encases the cam and valve mechanism, the bowl being disposed so as to have constant communication with the lower ends of the cylinders 2 and 3 and also with the outlet duct 5, there being a passageway 77 extending from said duct through the lower end of the head block to permit free circulation of liquid between the bowl and outlet duct.

Upon the front of the head block 1 is secured a pipe fixture 78 having chambers 79 and 80 therein that have communication respectively with the inlet duct 4 and the outlet duct 5. A supply pipe 81 is connected with the fixture 78 so as to communicate with the inlet chamber 79, and an outlet pipe 82 is connected with said fixture communicating with the outlet chamber 80.

A bleed pipe 83 is arranged with its lower end disposed in the bottom of the bowl 76 from which it extends through the passageway 77 and outlet duct 5 with its upper end terminating in the chamber 80. The opening 84 through which the liquid passes from the outlet duct 5 into the chamber 80 is restricted in size so that the liquid pressure in the outlet duct and the bowl connected therewith is sufficiently higher than in the chamber 80 to cause outflow of liquid through the bleed pipe. In this manner the bowl is relieved of sediments.

Operation

The apparatus is mounted upon a suitable support (not shown), there being lugs 85 on the head block and another lug 86 on the fixture 78 for connection with such support. The supply pipe is connected with a suitable source from which the liquid to be metered is supplied under pressure, and the outlet pipe is extended to the desired point of delivery. The spindle 69 is operatively connected with a counter or indicator which may be of any suitable type. The particular construction of the counter or indicator, being immaterial to the present invention, is not herein shown.

When the apparatus is fully primed and the liquid to be metered is supplied under pressure thereto through the supply pipe 81, the bowl 76, inlet and outlet ducts 4 and 5, inlet valve chambers 11 and 12, transfer chambers 13 and 14, and the cylinders 2 and 3 are completely filled with the liquid and the operating parts are actuated to an extent proportionate to the flow thereof.

When the plungers and valves are disposed as in Fig. 11, the inlet valve 16 is open so that the liquid from the inlet duct 4 enters the transfer chamber 14 and cylinder 3 through the top thereof causing the down-stroke of the plunger 44, whereupon the cam-shaft is actuated. After completion of the down-stroke of the plunger 44 its inlet valve 16 is closed while the down-stroke of the plunger 43 is in progress under pressure of liquid admitted to the cylinder 2 by its open inlet valve 15, as indicated by the full lines in Fig. 12. Subsequent to the closing of the inlet valve 16 and before commencement of the up-stroke of the plunger 44 the outlet valve 18 is opened as indicated by dotted lines in Fig. 12 so that the liquid previously received in the upper end of the cylinder 3 is displaced by the upstroke of the plunger 44 and is expelled through its open outlet valve 18 into the outlet duct 5 to be finally discharged through the outlet pipe 82. After completion of the up-stroke of the plunger 44 its outlet valve 18 is closed while the down-stroke of the plunger 43 is being completed under pressure of liquid admitted by its open inlet valve 15 as indicated in Fig. 13. After completion of the down-stroke of the plunger 43 its inlet valve 15 is closed while the downstroke of the plunger 44 is in progress under pressure of liquid admitted by its open inlet valve 16, as indicated by full lines in Fig. 14. Subsequent to the closing of the inlet valve 15 and before commencement of the up-stroke of the plunger 43 the outlet valve 17 is opened as indicated by dotted lines in Fig. 14, so that the liquid previously received in the upper end of the cylinder 2 is displaced by the upstroke of the plunger 43 and is expelled through its open outlet valve 17 into the outlet duct 5 to be finally discharged through the outlet pipe 82.

The bore of the cylinders and the stroke length of the plungers are such that a definitely predetermined quantity of liquid enters each cylinder through its top upon each complete down-stroke of the corresponding plunger, such quantity constituting a unit of measurement. Upon the complete up-stroke of each plunger a corresponding quantity of liquid is displaced through the top of its cylinder to be finally expelled through the outlet pipe. Thus, the down-strokes of the plungers constitute measuring strokes and the up-strokes thereof constitute displacement strokes, and the volume of liquid that passes through the apparatus is proportionate with the travel of said plungers. The cam mechanism actuated by the plungers, and the spindle operatively connected therewith, are progressed accordingly as the plungers are actuated. By operatively connecting a suitable indicator or counter with the spindle the volume of liquid in measured units upon passing through the apparatus is registered or otherwise indicated thereby.

The bowl 76 is completely filled with liquid received through the passageway 77 from the outlet duct 5, and as the plungers reciprocate the liquid is drawn into the lower ends of the cylinders from the bowl during the up-strokes of the plungers and is displaced back into the bowl during the down-strokes thereof. By this provision the tendency of vacuum to form in the lower ends of the cylinders during the up-strokes of the plungers is substantially obviated.

Upon operation of the apparatus, should the liquid displacement by the plungers be greater or less than the predetermined amount, the quantity may be decreased or increased by adjusting the stroke length of the plungers accordingly. Such adjustment is conveniently made from the exterior of the apparatus by removing the lock-screw 58 and adjustably turning the notched disc 57 on the stem 55 so as to raise or lower the supporting shaft 49 for the rocker arms 47 and 48. In this manner the volume of liquid displacement by the plungers is adjustably varied and accurate measurement attained.

I claim:

1. In liquid metering apparatus, a head-block having cylinders therein and provided with an inlet and outlet for one end of each cylinder, inlet and outlet valves controlling the respective inlets and outlets, a plunger in each cylinder, a frame secured to said head-block, an adjustable supporting shaft in said frame and adjusting means therefor, rocker-arms pivoted on said shaft and connected respectively with said plungers, each rocker-arm having a roller, a cam-shaft journaled in said frame, cams on said cam-shaft engaged respectively by the rollers of the corresponding rocker-arms and disposed for relative alternate movement of said plungers, said cams being shaped so that the measuring stroke of either plunger is accompanied by turning movement of said cam-shaft and the displacement stroke of the other plunger, individual cams on said cam-shaft and members actuated thereby for operating said valves respectively, and a spindle geared to said cam-shaft for actuating an indicating means.

2. In liquid metering apparatus, measuring members, each consisting of a cylinder and its complemental plunger, means supporting said cylinders and providing a valve-controlled inlet and a valve-controlled outlet for the upper end of each cylinder, a frame secured to said means, a rocker-arm shaft adjustably mounted in said frame, rocker-arm members having pivotal movement on said shaft and operatively connected respectively with said plungers, a cam-shaft mounted in said frame, plunger cams on said cam-shaft respectively engaging said rocker-arm members disposed for relative alternate movement of said plungers, said cams being shaped so that the measuring stroke of either plunger is accompanied by turning movement of said cam-shaft and the displacement stroke of the other plunger, means for adjusting said rocker-arm shaft to thereby vary the stroke length of said plungers, valve cams on said cam-shaft and members actuated thereby for operating the valves for said inlets and outlets, and a spindle geared to said cam-shaft for actuating an indicating means.

3. In a liquid metering apparatus, measuring members, each having a cylinder and plunger therein and provided with an inlet and an outlet for the upper end of its cylinder, a valve for each inlet and outlet, a frame in connection with said members, a rotatable cam-shaft mounted in said frame, cams on said cam-shaft for said plungers, a rocker-arm supporting shaft adjustably mounted in said frame, rocker-arms having pivotal movement on said supporting shaft and operative engagement respectively with said plungers and corresponding cams, said cams being disposed for relative alternate movement of said plungers and so shaped that the measuring stroke of either plunger is accompanied by turning movement of said cam-shaft and the displacement stroke of the other plunger, individual cams on said cam-shaft and members actuated thereby for operating the respective valves for said inlets and outlets, and a spindle operatively connected with said cam-shaft for actuating an indicating means.

4. In liquid metering apparatus, a head-block including cylinders and providing inlet and outlet ducts having connections with the upper ends of said cylinders, inlet and outlet valves controlling said connections correspondingly, a plunger in each of said cylinders, a frame secured to said head-block, a rocker-arm shaft adjustably mounted in said frame, rocker-arms having pivotal movement on said shaft, a rotary cam-shaft mounted in said frame, plunger cams on said cam-shaft, said plungers, rocker-arms and plunger cams being operatively associated and so disposed that the measuring stroke of either plunger is accompanied by rotary movement of said cam-shaft and the displacement stroke of the other plunger, said plunger cams being so shaped that each plunger dwells momentarily at the ends of its strokes, valve cams arranged on said cam-shaft and members actuated thereby for operating the respective inlet and outlet valves, so that the outlet valves close and the inlet valves open in successive order during the dwell periods of said plungers following the displacement strokes thereof and the said inlet valves close and the outlet valves open in successive order during the dwell periods of the plungers following the measuring strokes thereof, a spindle operatively connected with said cam-shaft for actuating an indicator, and a bowl secured to said head-block encasing said frame and related parts therein, and having communication with the lower ends of said cylinders and outlet duct.

5. In liquid metering apparatus, a head-block including cylinders and providing inlet and outlet ducts having connections with the upper ends of said cylinders, inlet and outlet valves controlling said connections correspondingly, a plunger in each of said cylinders, a frame secured to said head-block, a rocker-arm shaft adjustably mounted in said frame, rocker arms having pivotal movement on said shaft, a rotary cam-shaft mounted in said frame, plunger cams on said cam-shaft, said plungers, rocker-arms and plunger cams being operatively associated and so disposed that the measuring stroke of either plunger is accompanied by rotary movement of said cam-shaft and the displacement stroke of the other plunger, said plunger cams being so shaped that each plunger dwells momentarily at the ends of its strokes, valve cams arranged on said cam-shaft and members actuated thereby for operating the respective inlet and outlet valves so that the outlet valves close and the inlet valves open in successive order during the dwell periods of said plungers following the displacement strokes thereof and the said inlet valves close and the outlet valves open in successive order during the dwell periods of the plungers following the measuring strokes thereof, and a spindle operatively connected with said cam-shaft for actuating an indicator.

6. In liquid metering apparatus, a head-block having cylinders and provided with inlet and outlets for the upper ends of said cylinders, valves controlling said inlets and outlets respectively, a plunger in each cylinder, a frame secured to said head-block, a rotary cam-shaft mounted in said frame having plunger and valve cams thereon, rocker-arms having pivotal supporting means therefor in said frame and operably associated respectively with said plungers and corresponding plunger cams, bell-cranks pivotally supported in said frame, and operably associated respectively with said valves and valve cams, said plunger cams being disposed for relative alternate movement of said plungers, and the valve cams being so disposed that during the measuring stroke of each plunger its complemental inlet valve is open and the outlet valve therefor is closed, and during the displacement stroke thereof said complemental inlet valve is closed and the corresponding outlet valve therefor is open, and a spindle operably connected with said cam-shaft for actuating an indicator.

7. In liquid metering apparatus, a head-block having cylinders and inlet and outlet ducts with connections communicating separately with the upper end of each cylinder, a separately operated valve for each of said connections, a plunger in each cylinder, mechanism supported in connection with the head-block and operably associated with the valves for said connections and said plungers so that said mechanism is actuated by said plungers during their measuring strokes as liquid is supplied under pressure through said inlet duct to said cylinders, a spindle operatively connected with said mechanism for actuating an indicator, and a bowl connected with said head-block encasing said mechanism and having communication with the lower ends of said cylinders and said outlet duct.

REUBEN E. BECHTOLD.